United States Patent [19]

Vehr

[11] Patent Number: 4,653,983
[45] Date of Patent: Mar. 31, 1987

[54] CROSS-FLOW FILM COOLING PASSAGES

[75] Inventor: James W. Vehr, Lake Park, Fla.

[73] Assignee: United Technologies Corporation, Hartford, Conn.

[21] Appl. No.: 812,099

[22] Filed: Dec. 23, 1985

[51] Int. Cl.⁴ .................................................. F01D 5/18
[52] U.S. Cl. ................................ 416/97 R; 415/115
[58] Field of Search ........................... 416/97 R, 97 A; 415/115; 60/757

[56] References Cited

U.S. PATENT DOCUMENTS

| | | | |
|---|---|---|---|
| 1,857,509 | 5/1932 | Holmstrom . | |
| 2,149,510 | 3/1939 | Darrieus | 60/41 |
| 2,220,420 | 11/1940 | Meyer | 60/41 |
| 2,236,426 | 3/1941 | Faber | 60/41 |
| 2,477,583 | 8/1949 | De Zubay et al. | 60/44 |
| 2,489,683 | 11/1949 | Stalker | 60/41 |
| 3,098,148 | 7/1963 | Piot et al. | 219/69 |
| 3,303,645 | 2/1967 | Ishibashi | 60/39.65 |
| 3,447,318 | 6/1969 | Caruel et al. | 60/39.65 |
| 3,515,499 | 6/1970 | Beer et al. | 416/95 |
| 3,527,543 | 9/1970 | Howald | 416/90 |
| 3,594,536 | 7/1971 | Holroyd | 219/69 |
| 3,619,076 | 11/1971 | Kydd | 416/90 |
| 3,635,586 | 1/1972 | Keat et al. | 416/97 |
| 3,672,787 | 6/1972 | Thorstenson | 416/97 A |
| 3,746,827 | 7/1973 | Martin et al. | 219/69 |
| 3,778,183 | 12/1973 | Luscher et al. | 415/115 |
| 3,799,696 | 3/1974 | Redman | 416/97 |
| 3,801,218 | 4/1974 | Moore | 416/97 A |
| 3,830,450 | 8/1974 | Williams et al. | 244/42 |
| 3,844,677 | 10/1974 | Evans | 416/84 |
| 3,889,903 | 6/1975 | Hilby | 244/42 |
| 3,915,106 | 10/1975 | De Witt | 114/66.5 |
| 3,995,422 | 12/1976 | Stamm | 60/39.66 |
| 4,142,824 | 3/1979 | Andersen | 415/115 |
| 4,162,136 | 7/1979 | Parkes | 416/97 |
| 4,168,938 | 9/1979 | Dodd | 416/97 |
| 4,197,443 | 4/1980 | Sidenstick | 219/69 |
| 4,203,706 | 5/1980 | Hess | 416/99 A |
| 4,214,722 | 7/1980 | Tamura | 244/208 |
| 4,267,698 | 5/1981 | Hartmann et al. | 60/756 |
| 4,303,374 | 12/1981 | Braddy | 416/97 |
| 4,314,442 | 2/1982 | Rice | 60/39.05 |
| 4,384,823 | 5/1983 | Graham | 416/1 |

FOREIGN PATENT DOCUMENTS

| | | | |
|---|---|---|---|
| 599697 | 6/1960 | Canada | 415/115 |
| 2840103 | 3/1979 | Fed. Rep. of Germany | 415/115 |
| 55-114806 | 9/1980 | Japan . | |
| 665155 | 1/1952 | United Kingdom . | |

OTHER PUBLICATIONS

Flight and Aircraft Engineer, No. 2460, vol. 69, 3-1-6-56, pp. 292-295.
Advances in Heat Transfer by Richard J. Goldstein, vol. 7, Academic Press (N.Y. 1971), The Monograph Film Cooling, pp. 321-379.
NASA Technical Paper 1546 Influence of Coolant Tube Curvature on Film Cooling Effectiveness as Detected by Infrared Imagery by S. Stephen Papell et al, 1979.

Primary Examiner—Everette A. Powell, Jr
Attorney, Agent, or Firm—Stephen E. Revis

[57] ABSTRACT

Film coolant passages through the wall of a hollow airfoil for a gas turbine engine are oriented to direct coolant fluid therefrom at a substantial acute angle to the downstream direction and at a shallow angle to the surface of the airfoil. Each passage includes a metering portion at its inlet end and a four sided diffusing portion at its outlet end. The diffusing portion includes a pair of adjoining surfaces which are both parallel to a central axis of the passage, and another pair of adjoining surfaces which diverge from the central axis, the diverging pair of surfaces being located on the downstream side of the passage. With this configuration the coolant completely fills the diffusing section and exits as a wide film of coolant within the boundary layer downstream of the passage outlet.

15 Claims, 14 Drawing Figures

CROSS-FLOW FILM COOLING PASSAGES

The Government has rights in this invention pursuant to Contract No. N00140-83-C-8897 awarded by the Department of the Navy.

DESCRIPTION

1. Technical Field

This invention relates to airfoils, and more particularly to film cooled airfoils.

2. Background Art

It is well known the external surface of airfoils may be cooled by conducting cooling air from an internal cavity to the external surface via a plurality of small passages. It is desired that the air exiting the passages remain entrained in the boundary layer on the surface of the airfoil for as long a distance as possible downstream of the passage to provide a protective film of cool air between the hot mainstream gas and the airfoil surface. The angle which the axis of the passage makes with the airfoil surface and its relation to the direction of hot gas flow over the airfoil surface at the passage breakout are important factors which influence film cooling effectiveness. Film cooling effectiveness E is defined as the difference between the temperature of the main gas stream (Tg) and the temperature of the coolant film ($T_f$) at a distance x downstream of the passage outlet, divided by the temperature difference between the temperature of the main gas stream and the coolant temperature ($T_c$) at the passage outlet (i.e., at x=0) thus, $E=(T_g-T_f)/(T_g-T_c)$. Film cooling effectiveness decreases rapidly with distance x from the passage outlet. Maintaining high film cooling effectiveness for as long a distance as possible over as large a surface area as possible is the main goal of airfoil film cooling.

It is well known in the art, that the engine airfoils must be cooled using a minimum amount of cooling air, since the cooling air is working fluid which has been extracted from the compressor and its loss from the gas flow path rapidly reduces engine efficiency. Airfoil designers are faced with the problem of cooling all the engine airfoils using a specified, maximum cooling fluid flow rate. The amount of fluid which flows through each individual cooling passage from an internal cavity into the gas path is controlled by the minimum cross-sectional area (metering area) of the cooling passage. The metering area is typically located where the passage intersects the internal cavity. The total of the metering areas for all the cooling passages and orifices leading from the airfoil controls the total flow rate of coolant from the airfoil, assuming internal and external pressures are fixed or at least beyond the designer's control. The designer has the job of specifying the passage size and the spacing between passages, as well as the shape and orientation of the passages, such that all areas of the airfoil are maintained below critical design temperature limits determined by the airfoil material capability, maximum stress, and life requirement considerations.

Ideally, it is desired to bathe 100% of the airfoil surface with a film of cooling air; however, the air leaving the passage exit generally forms a cooling film stripe no wider than or hardly wider than the dimension of the passage exit perpendicular to the gas flow. Limitations on the number, size, and spacing of cooling passages results in gaps in the protective film and/or areas of low film cooling effectiveness which may produce localized hot spots. Airfoil hot spots are one factor which limits the operating temperature of the engine.

U.S. Pat. No. 3,527,543 to Howald uses divergently tapered passages of circular cross section to increase the entrainment of coolant in the boundary layer from a given passage. The passages are also preferably oriented in a plane extending in the longitudinal direction or partially toward the gas flow direction to spread the coolant longitudinally upon its exit from the passage as it moves downstream. Despite these features, it has been determined by smoke flow visualization tests and engine hardware inspection that the longitudinal width of the coolant film from an eliptical passage breakout (i.e. Howald) continues to expand longitudinally only about a maximum of one passage exit minor diameter after the coolant is ejected on the airfoil surface. This fact, coupled with typical longitudinal spacing of three to six diameters between passages, result in areas of airfoil surface between and downstream of longitudinally spaced passages which receive no cooling fluid from that row of passages. Conical, angled passages as described in Howald U.S. Pat. No. 3,527,543 provide at best probably no more than 70% coverage (percentage of the distance between the centers of adjacent hole breakouts which is covered by coolant).

The velocity of the air leaving the cooling passage is dependent on the ratio of its pressure at the passage inlet to the pressure of the gas stream at the passage outlet. In general the higher the pressure ratio, the higher the exit velocity. Too high an exit velocity results in the cooling air penetrating into the gas stream and being carried away without providing effective film cooling. Too low a pressure ratio will result in gas stream ingestion into the cooling passage causing a complete loss of local airfoil cooling. Total loss of airfoil cooling usually has disastrous results, and because of this a margin of safety is usually maintained. This extra pressure for the safety margin drives the design toward the high pressure ratios. Tolerance of high pressure ratios is a desirable feature of film cooling designs. Diffusion of the cooling air flow by tapering the passage, as in the Howald patent discussed above is beneficial in providing this tolerance, but the narrow diffusion angles taught therein (12° maximum included angle) require long passages and, therefore, thick airfoil walls to obtain the reductions in exit velocities often deemed most desirable to reduce the sensitivity of the film cooling design to pressure ratio. The same limitation exists with respect to the trapezoidally shaped diffusion passages described in Sidenstick, U.S. Pat. No. 4,197,443. The maximum included diffusion angles taught therein in two mutually perpendicular planes are 7° and 14°, respectively, in order to assure that separation of the cooling fluid from the tapered walls does not occur and the cooling fluid entirely fills the passage as it exits into the hot gas stream. With such limits on the diffusing angles, only thicker airfoil walls and angling of the passages in the airfoil spanwise direction can produce wider passage outlets and smaller gaps between passages in the longitudinal direction. Wide diffusion angles would be preferred instead, but cannot be achieved using prior art teachings.

Figure 13:
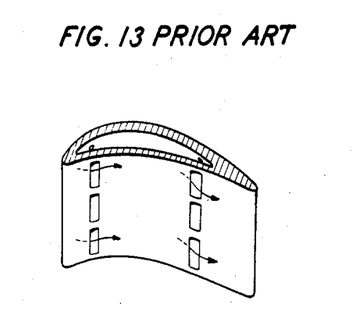
FIGS. 13 and 14 are reproductions of FIGS. 2 and 3, respectively, of prior art Japanese Patent No. 55-114806.
Figure 14:
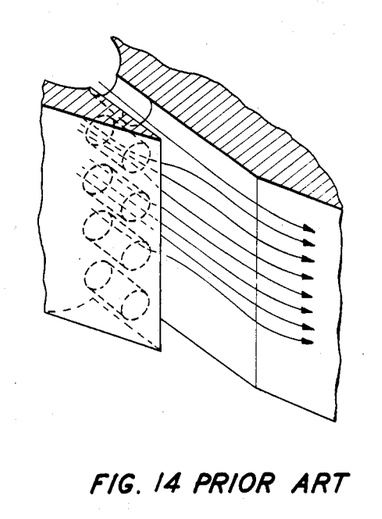

Japanese Patent No. 55-114806 shows, in its FIGS. 2 and 3 (reproduced herein as prior art FIGS. 18 and 19), a hollow airfoil having straight cylindrical passages disposed in a longitudinal row and emptying into a longitudinally extending slot formed in the external surface of the airfoil. While that patent appears to teach that the flow of cooling fluid from adjacent passages blends to form a film of cooling fluid of uniform thickness over the full length of the slot by the time the cooling fluid exits the slot and reaches the airfoil surface, our test experience indicates that the coolant fluid from the cylindrical passages moves downstream as a stripe of essentially constant width, which is substantially the diameter of the passage. Any diffusion which results in blending of adjacent stripes of coolant fluid occurs so far downstream that film cooling effectiveness at that point is well below what is required for most airfoil designs.

U.S. Pat. No. 3,515,499 to Beer et al describes an airfoil made from a stack of etched wafers. The finished airfoil includes several areas having a plurality of longitudinally spaced apart passages leading from an internal cavity to a common, longitudinally extending slot from which the cooling air is said to issue to form a film of cooling air over the airfoil external surface. In FIG. 1 thereof each passage appears to converge from its inlet to a minimum cross-sectional area where it intersects the slot. In the alternate embodiment of FIG. 9, the passage appears to have a small, constant size which exits into a considerably wider slot. Both configurations are likely to have the same drawbacks as discussed with respect to the Japanese patent; that is, the cooling fluid will not uniformly fill the slot before it enters the main gas stream, and considerably less than 100% film coverage downstream of the slot is likely.

Other publications relating to film cooling the external surface of an airfoil are: U.S. Pat. Nos. 2,149,510; 2,220,420; 2,489,683; and "Flight and Aircraft Engineer" No. 2460, Vol. 69, 3/16/56, pp. 292-295, all of which show the use of longitudinally extending slots for cooling either the leading edge or pressure and suction side airfoil surfaces. The slots shown therein extend completely through the airfoil wall to communicate directly with an internal cavity. Such slots are undesireable from a structural strength viewpoint; and they also require exceedingly large flow rates.

U.S. Pat. No. 4,303,374 shows a configuration for cooling the exposed, cut-back surface of the trailing edge of an airfoil. The configuration includes a plurality of longitudinally spaced apart, diverging passages within the trailing edge. Adjacent passages meet at their outlet ends to form a continuous film of cooling air over the cut-back surface.

A serial publication, "Advances in Heat Transfer" edited by T. F. Irvine, Jr. and J. P. Hartnett, Vol. 7, Academic Press (N.Y. 1971) includes a monograph titled *Film Cooling*, by Richard J. Goldstein, at pp. 321-379, which presents a survey of the art of film cooling. The survey shows elongated slots of different shapes extending entirely through the wall being cooled, and also passages of circular cross section extending through the wall.

DISCLOSURE OF THE INVENTION

One object of the present invention is improved means for cooling a wall over which a hot gas stream is flowing.

Another object of the present invention is an improved configuration for airfoil film coolant passages.

According to the present invention, a wall to be cooled is adapted to have a coolant fluid on a first side thereof and a hot gas flowing on a second side thereof in a downstream direction, wherein the wall includes a coolant passage therethrough including a metering section and a diffusing section in series flow relation, the metering section including a straight portion having a central axis and adapted to receive a coolant fluid from the coolant compartment, the central axis extending from the metering section through the diffusing section and forming a projected angle of between 20° and 90° with the downstream direction and a shallow angle with the outer surface of the wall, wherein selected surfaces of the diffusing section are parallel to the central axis and selected surfaces diverge from the central axis toward the passage outlet to assure that the coolant fluid fills the passage and exits the passage as a continuous film attached to the outer surface of the wall downstream of the passage outlet.

The coolant passages of the present invention are particularly suited to cooling the wall of a hollow gas turbine engine airfoil. As in Sidenstick et al U.S. Pat. No. 4,197,443, the diffusing section is a four sided passage which appears as a quadrilateral in a cross section taken perpendicular to the central axis of the metering section; however, it differs from Sidenstick et al in several respects. For example, in the present invention the central axis of the passage is angled 20° to 90° from the downstream direction, which is the direction of the streamlines of the hot gas flowing over the outlet of the passage. Preferably the passage is angled to inject the coolant fluid from the passage with a component of velocity in the downstream direction, wherein the central axis is at an angle of 40° to 70° to the downstream direction. Further distinguishing from Sidenstick et al, one pair of adjacent diffusion section surfaces are both parallel to the central axis of the passage, while the other two adjacent diffusing section surfaces diverge from the central axis. The central axis itself preferably intersects the external surface at a shallow angle of less than 30°. With this configuration, the coolant fluid from the metering section of the passage completely fills the diffusing section and forms a film of coolant within the boundary layer downstream of the outlet which provides improved cooling effectiveness and coolant coverage.

It is believed the key to the improvements provided by the present invention is in the combination of angling the coolant passages relative to the downstream direction and having only the downstream most surfaces of the diffusing section diverge from the central axis. The former feature increases the width of the cooling film perpendicular to the downstream direction without requiring an increase in the diffusion angle within the diffusing section. The latter feature prevents separation of the coolant fluid from the upstream most surfaces of the diffusing section thereby assuring that the entire diffusing section flows full.

The foregoing and other objects, features and advantages of the present invention will become more apparent in the light of the following detailed description of preferred embodiments thereof as illustrated in the accompanying drawing.

BEST MODE FOR CARRYING OUT THE INVENTION

Figure 1:
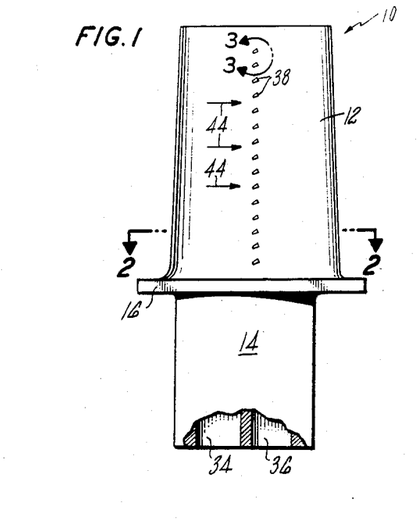
FIG. 1 is a simplified, illustrative side elevation view of a turbine blade for a gas turbine engine, partly broken away, which includes a row of coolant passages in accordance with the teachings of the present invention.
Figure 2:
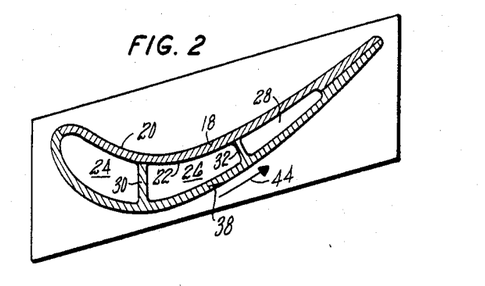
FIG. 2 is a cross-sectional view taken along the line 2—2 of FIG. 1.

As an exemplary embodiment of the present invention consider the turbine blade of FIG. 1 generally represented by the reference numeral 10. With reference to FIGS. 1 and 2, the blade 10 comprises a hollow airfoil 12 which extends in a spanwise or longitudinal direction from a root 14 which is integral therewith. A platform 16 is disposed at the base of the airfoil 12. The airfoil 12 comprises a wall 18 having an outer surface 20 and an inner surface 22. The inner surface 22 defines a longitudinally extending internal cavity which is divided into a plurality of adjacent longitudinally extending compartments 24, 26, 28 by longitudinally extending ribs 30, 32. A passage 34 within the root 14 communicates with the compartment 24; and a passage 36 within the root 14 communicates with both compartments 26 and 28. When the blade 10 is operated in its intended environment, such as in the turbine section of a gas turbine engine, coolant from a suitable source, such as compressor bleed air, is fed into the passage 34, 36 and pressurizes the compartments 24, 26, and 28.

Figure 6:
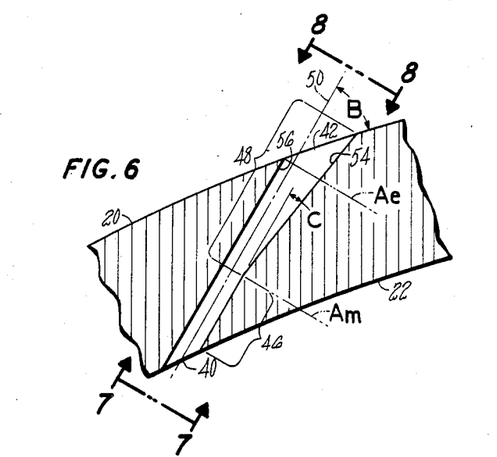
FIG. 6 is a cross-sectional view taken along the line 6—6 of FIG. 5.
Figure 7:
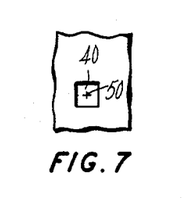
FIG. 7 is a view taken generally in the direction 7—7 of FIG. 6.

As shown in FIG. 1, the suction side of the airfoil 12 includes a longitudinally extending row of coolant passages 38. With reference to FIG. 6, each passage 38 extends from its inlet 40 at the inner surface 22 of the airfoil to its outlet 42 at the outer surface 20. Although the passages 38 in this particular row are identical, this is not a requirement of the present invention. Also, although not shown, the airfoil 12 could have additional rows of similarly shaped passages or of conventionally shaped passages through either the pressure or suction side walls of the airfoil. In this drawing only a single row of passages has been shown for purposes of simplicity and clarity. Such showing is intended to be illustrative only, and not limiting.

The coolant passages 38 may be formed by any suitable means. A preferred method is by the well known technique of electro-discharge machining (EDM) using an electrode having the shape of the passage to be formed. The method for forming the passages is not considered to be an aspect of the present invention.

Throughout the drawing the arrows 44 represent the direction of flow (i.e., streamlines) of hot gases over the external surface of the airfoil. For purposes of the description of the present invention, the direction of flow of hot gases over the surface of the airfoil shall be considered the downstream direction. Thus, at any point on the surface of the airfoil, the downstream direction is tangent to the surface of the airfoil and, except perhaps close to the airfoil tip or the airfoil base, where atypical currents are generated, is substantially perpendicular to the spanwise direction of the airfoil, which is the radial direction when the airfoil is disposed within the gas turbine engine.

The coolant passages 38 are shown greatly enlarged in FIGS. 3-8. Each passage 38 includes, in series flow relation, a metering section 46 followed by a diffusing section 48. In this embodiment, the metering section 46 has a square cross section; however, its specific cross-sectional shape is not critical to the present invention and may, for example, be circular. By definition, the metering section 46 is that portion of the coolant passage 38 having the smallest cross-sectional area perpendicular to the direction of flow through the passage 38, which is along the passage central axis 50, which passes through the geometric center of the cross-sectional area of the metering section 46.

Preferably the metering section is straight and has a constant cross-sectional area for a distance at least long enough to form a well defined metering area in order to maintain coolant flow rate control. A metering section length at least equivalent to the effective diameter of the metering area is usually a practical lower limit. The outlet of the metering section 46 is coincident with the inlet to the diffusing section 48 and is located at what is herein designated as the metering plane $A_m$ (FIG. 6) which is a plane perpendicular to the central axis 50.

Figure 4:
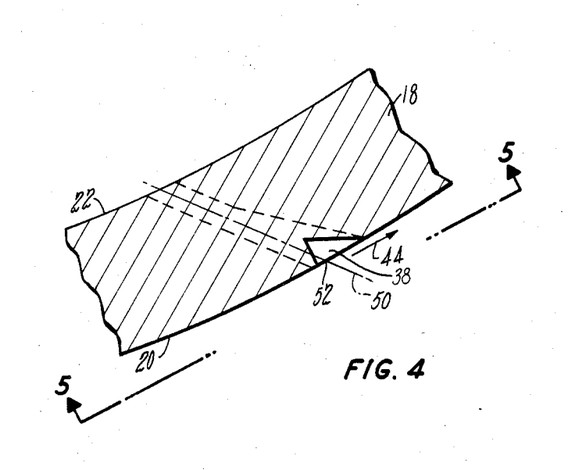
FIG. 4 is a cross-sectional view taken perpendicular to the spanwise direction of the airfoil.
Figure 5:
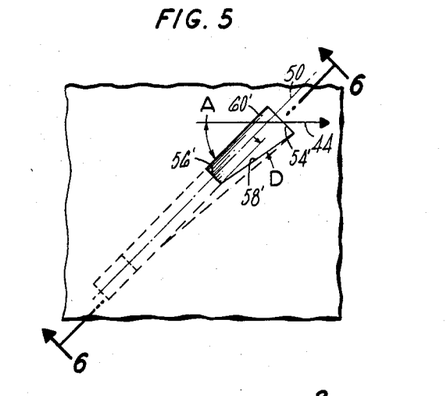
FIG. 5 is a view taken in the direction 5—5 of FIG. 4 for the purpose of showing the angular relationship of the coolant passage to the direction of flow of hot gases over the external surface of the airfoil.

In accordance with the present invention, the central axis 50 of the passage 38 forms a projected angle A with the downstream direction 44 in a plane substantially tangent to the outer surface of the airfoil wall at the coolant passage outlet where the central axis 50 intersects the outer surface. This is best shown in FIGS. 4 and 5. FIG. 4 is a section taken perpendicular to the longitudinal or spanwise direction of the airfoil through the point 52 where the central axis 50 intersects the outer surface 20. The section plane 5—5 in FIG. 4 is tangent to the outer surface at the point 52. The angle A, in FIG. 5, is therefore the projected angle between the central axis 50 and the downstream direction 44 in the tangent plane passing through the point 52. The angle A may be anywhere from 20° to 90°, but is preferably between 40° and 70°, most preferably 45°.

The central axis 50 must also intersect the outer surface 20 at a shallow angle to assure that the coolant fluid, as it exits the passage 38, attaches itself to the surface 20 as a thin film, and remains attached for a considerable distance downstream. This angle is herein designated by the letter B in FIG. 6. The angle B is preferably no greater than about 30°, and is most preferably between 18° and 25°. Angles which are too large may result in the coolant fluid becoming mixed with the hot gases and swept downstream without forming a film on the surface. The most preferred range further increases the area covered by the coolant film.

Figure 8:
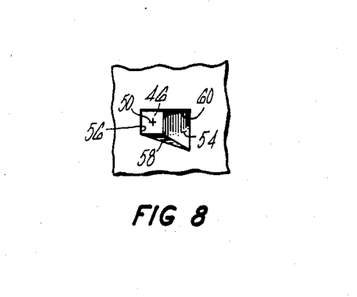
FIG. 8 is a view taken generally in the direction 8—8 of FIG. 6.

In FIG. 8, which is a "gun barrel" view of the passage 38 looking directly down the central axis 50 from outside the airfoil, the four sides of the diffusing section 48 can be seen. The diffusing section 48 comprises a pair of spaced apart, facing side surfaces 54, 56, which interconnect a pair of spaced apart, facing end surfaces 58, 60. The surfaces 54, 56, 58, and 60 intersect the external surface 20 of the airfoil to define the outlet 42 of the passage 38. The adjacent surfaces 56 and 60 are perpendicular to the plane of the paper in FIG. 8. In FIG. 5 the outer edge of the side surface 56 is designated by the reference numeral 56', the outer edge of the side surface 54 is designated by the reference numeral 54', the outer edge of the end surface 60 is designated by the reference numeral 60', and the outer edge of the end surface 58 is designated by the reference numeral 58'.

In this specification and appended claims, the side surface whose outer edge is furthest upstream is herein referred to as the upstream side surface, with the other side surface being referred to as the downstream side surface. Thus, referring to FIG. 5, the surface 56 is the upstream side surface and the surface 54 is the downstream side surface. Similarly, the end surface of the diffusing section whose outer edge is furthest upstream is the upstream end surface, while the other end surface is the downstream end surface. Thus, the end surface 60 is the upstream end surface and the end surface 58 is the downstream end surface. In accordance with this exemplary embodiment of the present invention, the upstream side surface 56 and the upstream end surface 60 are both parallel to the central axis 50 and are simply extensions of (i.e., in the same plane as) surfaces of the metering section 46. On the other hand, the downstream side surface 54 diverges from the central axis 50 toward the passage outlet at an angle designated by the letter C (FIG. 6) which is no greater than 15° and preferably between 5° and 15°. This helps further reduce the angle between the outer surface 20 of the airfoil and the initial direction of the coolant fluid as it is ejected from the passage 38, thereby improving the ability of the coolant fluid to attach itself to the airfoil as a film within the boundary layer downstream of the passage.

The downstream end surface 58, in accordance with the present invention, diverges from the central axis 50 toward the passage outlet 42 at an angle D (FIG. 5) which is preferably between 5° and 15° and most preferably between 7° and 13°. The divergence of the downstream surfaces 54, 58 from the central axis 50 serves the important function of diffusing the flow of coolant air so as to reduce its velocity and momentum in the direction of the central axis to enable the coolant to more easily attach itself to the airfoil outer surface downstream of the outlet 42. Additionally, the diverging surfaces help spread the coolant over a larger area of the outer surface.

Figure 9:
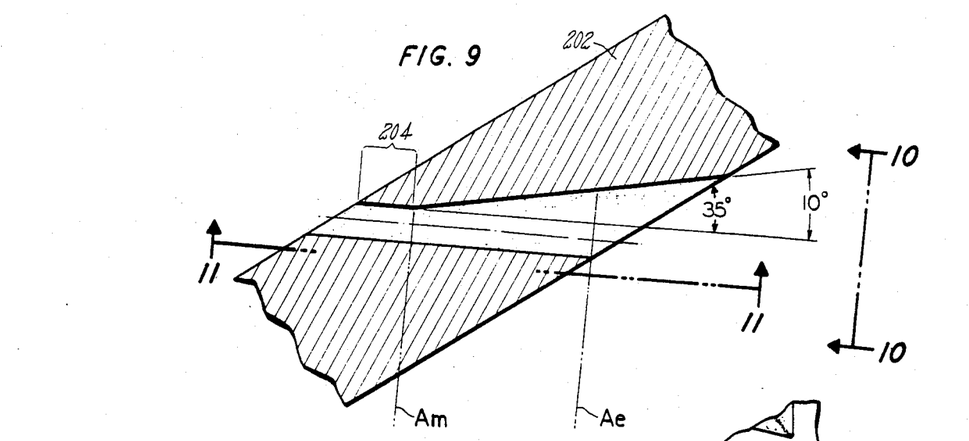
FIG. 9 is a cross-sectional view of a test plate including cooling passages having a baseline configuration against which comparisons of the present invention may be made.
Figure 10:
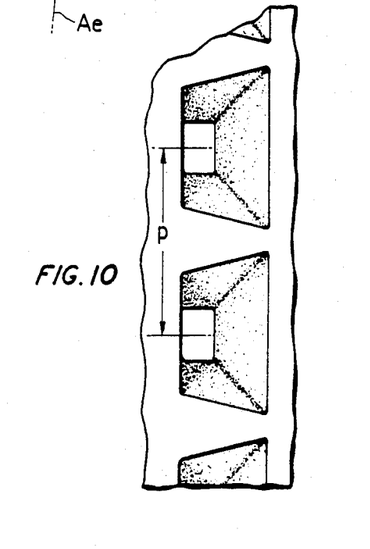
FIG. 10 is a view taken along the line 10—10 of FIG. 9.
Figure 11:
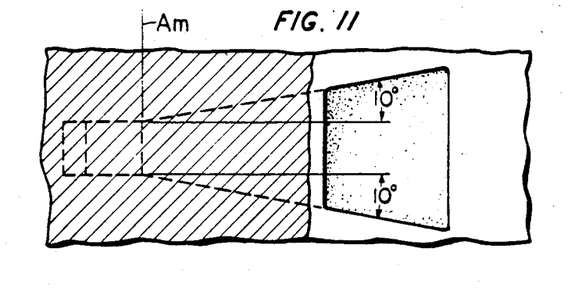
FIG. 11 is a sectional view taken along the line 11—11 of FIG. 9.

For purposes of comparison, coolant passages according to the present invention were tested against a row of shaped passages as shown in FIGS. 9–11 herein referred to as the "baseline" configuration. These shaped passages are similar to the shaped passages described in Sidenstick, U.S. Pat. No. 4,197,443, except the divergence angles are 10°. In the tests described below these passages flowed "full" and produce a coolant film of substantially the same width as the passage outlet despite the teaching of Sidenstick which suggests maximum divergence angles of 7°.

Figure 12:
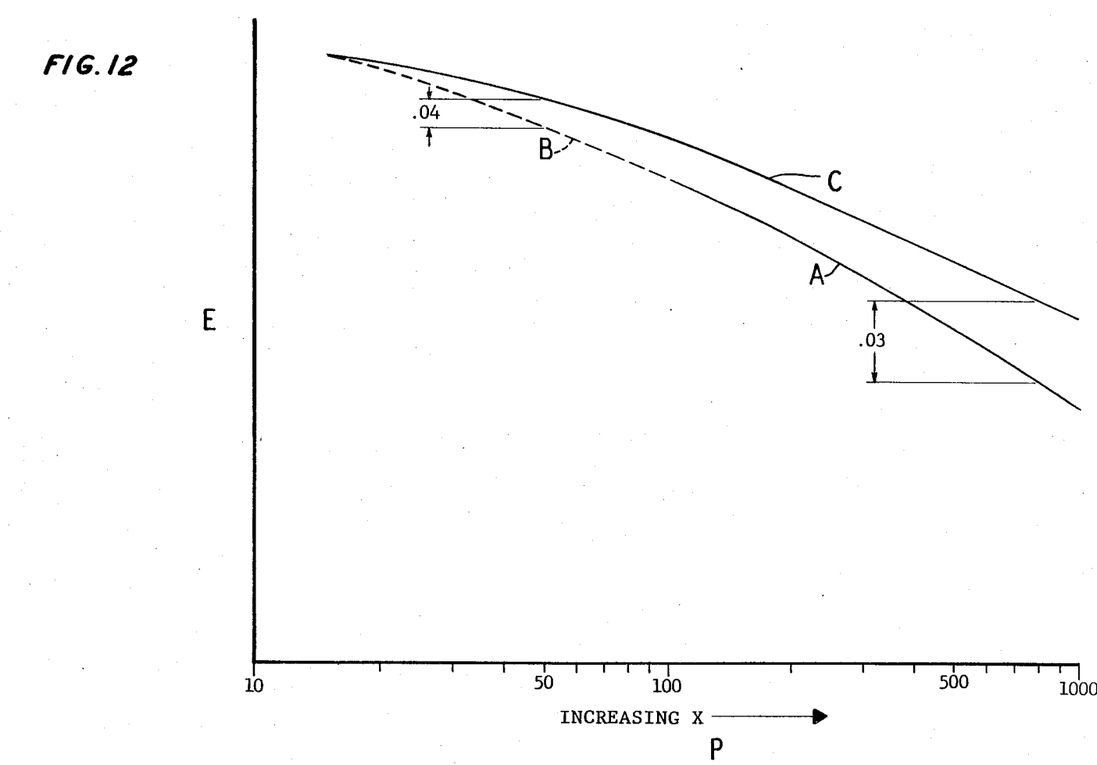
FIG. 12 is a graph which may be used to compare the film cooling effectiveness of a coolant passage configuration of the present invention to that of the baseline passage configuration of FIGS. 9-11.

The graph of FIG. 12 shows the test results. In FIG. 12 the horizontal axis is a dimensionless parameter P whose value is the ratio of the distance "x" from the outlet of the cooling passage (in the direction of the mainstream gas flow over the outlet—i.e., in the downstream direction) to a number directly related to the mass flow rate of cooling air exiting the passage. The vertical axis is a measure of the film cooling effectiveness E (as hereinabove defined) measured at the distance x downstream of the passage outlet. The maximum possible cooling effectiveness is 1.0. Because P is directly related to distance from the passage outlet, and since the distance downstream of the outlet is the only variable in these tests, P may be considered as a measure of distance downstream of the passage outlet.

The curve labeled A is for a row of baseline coolant passages 200 through a test plate 202 such as shown in FIGS. 9–11. The test was conducted in a planar wind tunnel. The area ratio $A_e/A_m$ for each passage was 10.0, where $A_e$ is the cross-sectional area of the passage outlet measured in the plane labeled $A_e$ in FIG. 9, and where $A_m$ is the cross-sectional area of the metering section 204 as measured in the plane labeled $A_m$. The pitch to diameter ratio, p/d, was 6.57, wherein p (FIG. 10) is the distance between the centers of adjacent metering sections 200 and d is the effective diameter of the metering section, which is the diameter of a circle having the same cross-sectional area $A_m$.

The curve labeled B is for a baseline configuration similar to FIGS. 9–11 having a pitch to diameter ratio, p/d, of 6.57 and an area ratio $A_e/A_m$ of 3.6 and tested in a curved wind tunnel.

Figure 3:
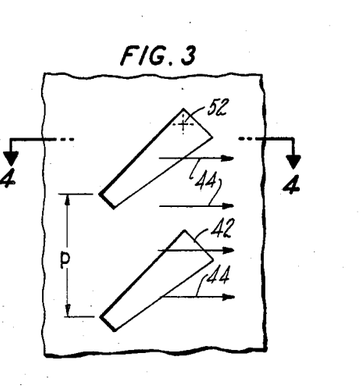
FIG. 3 is an enlarged view of the area 3—3 of FIG. 1 showing the outlets of the coolant passages of the present invention.

The curve C is for a row of coolant passages according to the present invention formed in a flat test plate and similar in cross-sectional appearance to FIGS. 4 through 8. The test was conducted in a curved wind tunnel. Using the labels appearing in FIGS. 5 and 6, the angle A was 45°, angle B was 23°, angle C was 10°, angle D was 10°, the area ratio $A_e/A_m$ was 1.8, and the pitch to diameter ratio, p/d, was 7.97. $A_e$ and $A_m$ were measured in planes having similar designations in FIG. 6, both of which are perpendicular to the central axis of the coolant passage. The pitch p was the spacing between the metering passages 40, as shown in FIG. 3. And the diameter d was the effective diameter of the metering passage at the plane $A_m$.

The improvement in film cooling effectiveness, E, provided by the present invention is significant and can readily be seen in FIG. 12. For example, at P=50 the present invention has a film cooling effectiveness 0.04 higher than that of the baseline shaped passages. At P=800 the difference in cooling effectiveness is 0.03. To put this in perspective, assuming a coolant temperature at the passage outlet of 1200° F. and a mainstream gas temperature of 2600° F., a 0.02 increase in cooling effectiveness translates into about a 28° F. decrease in the temperature of the coolant film for the same mass flow rate of coolant.

Although the invention has been shown and described with respect to a preferred embodiment thereof, it should be understood by those skilled in the art that other various changes and omissions in the form and detail of the invention may be made without departing from the spirit and scope thereof.

I claim:

1. A cooled wall having an outer surface adapted to be exposed to a hot gas stream flowing in a downstream direction over said outer surface, and an inner surface adapted to define a portion of a coolant compartment for receiving coolant therein under pressure, the improvement comprising:

a coolant passage within said wall, said passage including a metering section and a diffusing section in series flow relation, said metering section having an inlet adapted to receive a flow of coolant from the coolant compartment and adapted to control the rate of flow of coolant fluid through said passage, said metering section including a straight portion having a central axis, said central axis forming a shallow angle with said outer surface of said wall and forming a projected angle of between 20° and 90° with the downstream direction in a plane substantially tangent to said outer surface at said coolant passage outlet, said diffusing section including an upstream side surface parallel to the central axis and a downstream side surface spaced from and facing said upstream side surface and diverging from said upstream side surface toward said passage outlet at a first angle, said diffusing section also including an upstream end surface parallel to the central axis and a downstream end surface spaced from and facing said upstream end surface and diverging from said upstream end surface toward said passage outlet at a second angle, said upstream and downstream end surfaces interconnecting said upstream and downstream side surfaces, said side surfaces and end surfaces intersecting said outer surface to define said passage outlet.

2. The cooled wall according to claim 1 wherein said second angle is between 5° and 15°.

3. The cooled wall according to claim 2 wherein said first angle is between 5° and 15°.

4. The cooled wall according to claim 3 wherein said projected angle is between 40° and 70°.

5. The cooled wall according to claim 3 wherein said shallow angle is less than about 30°.

6. The cooled wall according to claim 5 wherein said projected angle is between 40° and 70°.

7. The cooled wall according to claim 1 wherein said straight portion of said metering section intersects said inner surface to form an inlet to said coolant passage, and said straight portion comprises an outlet which is also an inlet for said diffusing section.

8. The cooled wall according to claim 7 wherein said straight portion of said metering section includes a first surface extending the length of said straight portion and which is in the same plane as said upstream end surface, and wherein said straight portion of said metering section includes a second surface extending the length of said straight portion and which is in the same plane as said upstream side surface.

9. The cooled wall according to claim 1 wherein said wall is the external wall of a hollow airfoil.

10. The cooled wall according to claim 4 wherein said wall is the external wall of a hollow airfoil.

11. The cooled airfoil wall according to claim 10 wherein said shallow angle is less than about 30°.

12. The cooled airfoil wall according to claim 10 wherein said straight portion of said metering section includes a first surface extending the length of said straight portion and which is in the same plane as said upstream end surface, and wherein said straight portion of said metering section includes a second surface extending the length of said straight portion and which is in the same plane as said upstream side surface.

13. The cooled wall according to claim 8 wherein said wall is the external wall of a hollow airfoil.

14. The cooled airfoil wall according to claim 12 including a plurality of said coolant passages therethrough having their outlets spaced apart and substantially aligned in the spanwise direction of said airfoil wall.

15. The cooled airfoil wall according to claim 12 wherein said projected angle is about 45°.

* * * * *